United States Patent
Hahn

(10) Patent No.: US 11,230,086 B2
(45) Date of Patent: Jan. 25, 2022

(54) INFRARED STEALTH ELEMENT USING DUAL BAND PERFECT ABSORPTION METAMATERIAL

(71) Applicant: INDUSTRY-ACADEMIC COOPERATION FOUNDATION YONSEI UNIVERSITY, Seoul (KR)

(72) Inventor: Jae Won Hahn, Seoul (KR)

(73) Assignee: INDUSTRY-ACADEMIC COOPERATION FOUNDATION YONSEI UNIVERSITY, Seoul (KR)

( * ) Notice: Subject to any disclaimer, the term of this patent is extended or adjusted under 35 U.S.C. 154(b) by 257 days.

(21) Appl. No.: 16/339,149

(22) PCT Filed: Dec. 15, 2017

(86) PCT No.: PCT/KR2017/014795
§ 371 (c)(1),
(2) Date: Apr. 3, 2019

(87) PCT Pub. No.: WO2018/131805
PCT Pub. Date: Jul. 19, 2018

(65) Prior Publication Data
US 2019/0322078 A1 Oct. 24, 2019

(30) Foreign Application Priority Data
Jan. 11, 2017 (KR) .......................... 10-2017-0004286

(51) Int. Cl.
*B32B 3/24* (2006.01)
*B32B 15/08* (2006.01)
(Continued)

(52) U.S. Cl.
CPC .............. *B32B 15/08* (2013.01); *B32B 3/266* (2013.01); *B32B 27/281* (2013.01);
(Continued)

(58) Field of Classification Search
CPC ................................................. H01Q 15/0013
See application file for complete search history.

(56) References Cited

U.S. PATENT DOCUMENTS

| 2009/0021415 A1 | 1/2009 | Yu et al. | |
| 2013/0170018 A1* | 7/2013 | Domash | G02F 1/29 359/320 |

(Continued)

FOREIGN PATENT DOCUMENTS

| JP | 2009-534287 A | 9/2009 |
| JP | 2011-128162 A | 6/2011 |

(Continued)

OTHER PUBLICATIONS

Search Report, dated Mar. 9, 2018, for International Application No. PCT/KR2017/014795.
(Continued)

*Primary Examiner* — William P Watkins, III
(74) *Attorney, Agent, or Firm* — LRK Patent Law Firm

(57) ABSTRACT

The present invention relates to an infrared stealth element using a dual band perfect absorption metamaterial. The infrared stealth element includes: a first metal layer; an insulator layer formed on an upper part of the first metal layer; and a second metal layer formed on an upper part of the insulator layer. The second metal layer includes at least one among a metal ring and a metal dot.

10 Claims, 10 Drawing Sheets

(51) Int. Cl.
  B32B 3/26      (2006.01)
  B32B 27/28     (2006.01)
  H01Q 15/00     (2006.01)
(52) U.S. Cl.
  CPC ..... *B32B 2307/102* (2013.01); *B32B 2311/08* (2013.01); *B32B 2315/00* (2013.01); *B32B 2379/08* (2013.01); *H01Q 15/0013* (2013.01)

(56) References Cited

U.S. PATENT DOCUMENTS

2018/0069319 A1* 3/2018 Cho .................... B32B 3/14
2018/0356290 A1* 12/2018 Winger ................ G01J 5/061

FOREIGN PATENT DOCUMENTS

| KR | 10-2012-0058924 A | 6/2012 |
| KR | 10-2013-0039654 A | 4/2013 |
| KR | 10-2015-0000616 A | 1/2015 |
| KR | 10-1603966 B1     | 3/2016 |
| WO | 2007/121079 A1    | 10/2007 |

OTHER PUBLICATIONS

Written Opinion, dated Mar. 9, 2018, for International Application No. PCT/KR2017/014795.

\* cited by examiner

INFRARED STEALTH ELEMENT USING DUAL BAND PERFECT ABSORPTION METAMATERIAL

CROSS-REFERENCE TO RELATED APPLICATIONS

The present application is a U.S. National Phase entry from International Application No. PCT/KR2017/014795, filed Dec. 15, 2017, which claims priority to Korean Patent Application No. 10-2017-0004286, filed Jan. 11, 2017, the disclosures of which are incorporated by reference herein in their entirety.

BACKGROUND OF THE INVENTION

1. Field of the Invention

The present invention relates to an infrared stealth element, and more specifically, to an infrared stealth element using a dual band perfect absorption metamaterial.

2. Background of Related Art

Generally, minimizing the signals detected by a radar in a battlefield is referred to as stealth. Recently, in addition to existing radars, an infrared technique for detecting infrared signals, together with sound signals for detecting submarines, is widely used as a method of detecting enemy soldiers. Accordingly, various stealth techniques are studied to minimize these various detection signals.

The infrared stealth technique measures radiation signals emitted from a surface, and the radiation signals exponentially increase with respect to temperature according to the Planck's radiation law. Accordingly, a method of reducing infrared detection signals by lowering temperature of the surface is widely used. In addition, a technique of lowering temperature of exhaustion gas of a fighter plane or preventing high-temperature gas from being exposed to the outside by covering the outlet of the exhaustion gas is used to reduce infrared signals detected by an infrared missile.

A signal emitted from an object by black body radiation propagates through the atmosphere, and enters and is detected by an infrared detector. Radiation energy emitted from the surface may be calculated by applying emissivity to the Planck's radiation law, and a signal measured by the detector by applying atmospheric transmittance may be expressed as shown below in Equation 1.

$$\int_0^\infty S_\lambda(T)d\lambda = \int_0^\infty \frac{2\pi hc^2}{\lambda^5[\exp(hc/\lambda kT)-1]} \cdot \varepsilon(\lambda) \cdot T_{atm}(\lambda)d\lambda \quad \text{[Equation 1]}$$

Here, the first formula in the integral equation is the Planck's radiation law, in which λ denotes wavelength of light, T denotes surface temperature of an object, h denotes the Planck constant, and c denotes velocity of light. In addition, ε denotes spectral emissivity of an object surface, and $T_{atm}$ denotes transmittance of the atmosphere. To reduce the magnitude of the infrared signal expressed in Equation 1, temperature of the radiator surface which emits infrared light is lowered, or the radiator is designed to change the structure of the surface to have high surface emissivity in a wavelength band (5 to 8 μm) of low atmospheric transmittance and low surface emissivity in the atmospheric transmission window regions (3 to 5 μm and 8 to 14 μm) of high atmospheric transmittance, so that the infrared detected signals can be reduced. Accordingly, the stealth technique may be divided into a method of reducing the amount of infrared light emitted from an object and a method of reducing the amount of the infrared light, which is emitted from the object, entering the detector.

FIG. 1 is a view showing spectral transmittance of the atmosphere according to the wavelength in an infrared region. If the wavelength can be adjusted to absorb the infrared light emitted from an object in the process of propagation as a stealth technique, together with the method of reducing the surface temperature of an object as described above, detected infrared signals of the object can be reduced. Accordingly, the stealth technique can be developed by utilizing the technique of adjusting the wavelength of the infrared light emitted from the surface to the absorption wavelength.

It is also important to reduce the reflectivity of the infrared light emitted from an offensive infrared weapon, in addition to preventing military equipment from being detected by an infrared detector, to enhance survivability of the military equipment. An offensive laser-guided weapon radiates infrared laser to an attack target object and is guided by infrared laser light reflected by the target object to attack the object. The wavelength of the infrared laser light generally used for infrared-guided weapons is 1.54 μm considering safety of the eyes. In this case, signals of the guided laser light scattered from the object should be reduced by making the surface of the object absorb the laser light. To realize reduction of the signals, absorptivity of the 1.54 μm infrared laser light on the surface should be enhanced.

The black body radiation described above in Equation 1 is emitted from the surface of an object at a temperature of T. At this point, spectral distribution of the emitted black body radiation may be changed by changing the structure of the surface. As a representative method, a perfect absorber using a metal-insulator-metal (MIM) thin film structure is widely used. Electrons in the metal interact with incident light to generate a surface plasmon, and at this point, as the surface plasmon is generated to resonate at a specific wavelength, a perfect absorber of a metamaterial structure having an absorptivity close to 1 can be implemented at the specific wavelength.

As a structure of the perfect absorber like this, a perfect absorber having a T-shape structure configured of silica $SiO_2$ and silver Ag as shown in FIG. 2 is known. The spectral characteristic of the perfect absorber may be changed by changing the design of the T structure. However, the perfect absorber of the structure like this has a disadvantage in that the resonance wavelength varies according to the polarization and incident angle of incident light. Accordingly, development of a perfect absorber of a new structure is required.

SUMMARY OF THE INVENTION

The present invention has been made in view of the above problems, and it is an object of the present invention to provide an infrared stealth element, which can minimize infrared light signals emitted from military equipment and detected by an infrared detector, and absorb offensive infrared light.

The above and other objects and advantages of the present invention may become clear from the following description of the preferred embodiment.

To accomplish the above object, according to one aspect of the present invention, there is provided an infrared stealth element including: a first metal layer; an insulator layer formed on the top of the first metal layer; and a second metal layer formed on the top of the insulator layer, in which the second metal layer includes at least any one among a metal ring and a metal dot.

At this point, if the second metal layer includes both the metal ring and the metal dot, the metal dot is preferably located at the center of the metal ring.

In addition, the metal ring and the metal dot may be configured in plurality, and the distance $a_0$ between adjacent metal dots is determined according to permittivity of the insulator layer and the second metal layer.

In addition, the first metal layer and the second metal layer may be formed of the same metal or different metals, and preferably, the first metal layer and the second metal layer may be formed of silver Ag, and thickness of the first metal layer may be 0.01 to 0.2 μm.

In addition, the insulator layer may be formed of silica $SiO_2$ or polyimide, and thickness of the insulator layer may be 0.01 to 0.2 μm.

On the other hand, the surface of the second metal layer may be coated with a dielectric thin film layer.

DETAILED DESCRIPTION OF THE PREFERRED EMBODIMENT

Hereafter, the present invention will be described in detail with reference to the embodiments and accompanying drawings of the present invention. The embodiments are presented as an example only to describe the present invention in further detail, and it is apparent to those skilled in the art that the scope of the present invention is not limited by the embodiments.

In addition, all technical and scientific terms used in this specification have the same meaning as is generally understood by those skilled in the art unless defined otherwise, and when the terms conflict, description of this specification including the definition will take precedence.

The elements unrelated to the description are omitted from the drawings to clearly describe the proposed present invention, and through the specification, like elements will be denoted by similar reference symbols. In addition, when one element is referred to "include" another element, this means not to preclude the element, but further includes the element, as far as an opposed description is not specially specified. In addition, a "unit" described in the specification means a unit or a block which performs a specific function.

In each of the steps, identification symbols (a first, a second, etc.) are used for the convenience of explanation, not to describe the sequence of the steps, and unless the context clearly indicates a specific sequence, each of the steps may be embodied to be different from the specified sequence. That is, the steps may be embodied in a sequence the same as the specified sequence, may be embodied practically at the same time, or may be embodied in an opposite sequence.

Figure 3:
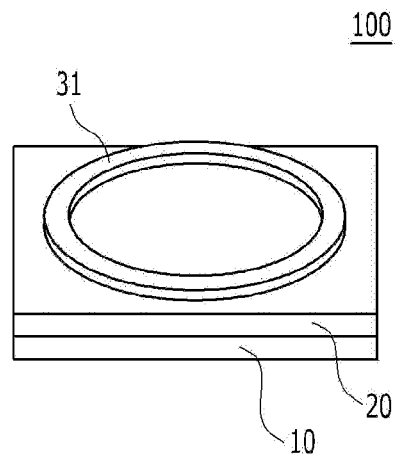
FIG. 3 is a view schematically showing an infrared stealth element according to an embodiment of the present invention.
Figure 4:
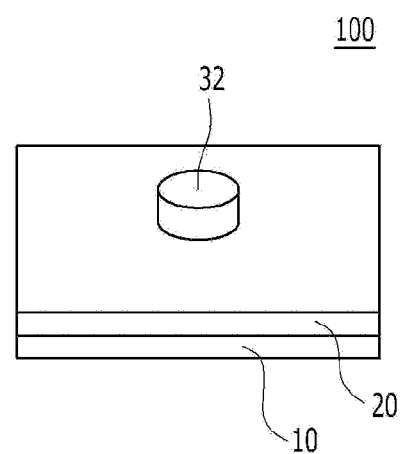
FIG. 4 is a view schematically showing an infrared stealth element according to an embodiment of the present invention.
Figure 5A:
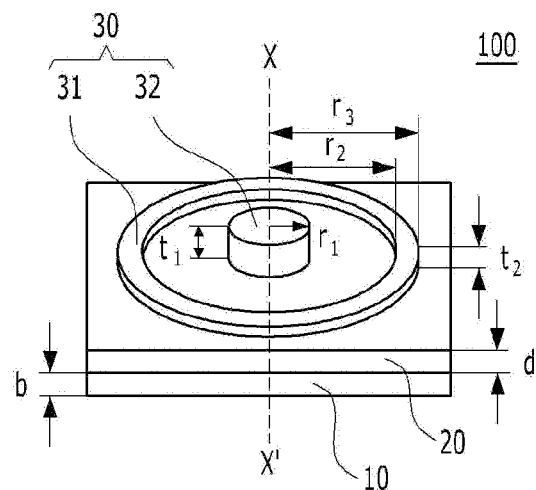
FIG. 5A is a view schematically showing an infrared stealth element according to an embodiment of the present invention.
Figure 5B:
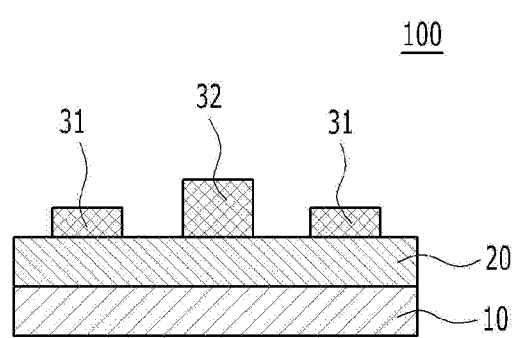
FIG. 5B is a view showing the cross section (X-X') of FIG. 5A.

FIGS. 3, 4 and 5A are views schematically showing an infrared stealth element according to an embodiment of the present invention, and FIG. 5B is a cross-sectional view of FIG. 5A. Describing with reference to FIGS. 3 to 5B, an infrared stealth element 100 according to an embodiment of the present invention includes: a first metal layer 10, an insulator layer 20 formed on the top of the first metal layer 10, and a second metal layer 30 formed on the top of the insulator layer 20, and the second metal layer 30 may include a metal ring 31 (see FIG. 3), a metal dot 32 (see FIG. 4), or both the metal ring 31 and the metal dot 32 (see FIG. 5A). When the second metal layer 30 includes both the metal ring 31 and the metal dot 32, the metal dot 32 is preferably located at the center of the metal ring 31. As the first metal layer 10, the insulator layer 20 and the second metal layer 30 are sequentially stacked and a dual band perfect absorption metamaterial of a new structure (a metal-insulator-metal (MIM) structure) diversely modifying the second metal layer 30 is used, the infrared stealth element 100 of the present invention may absorb laser light of an offensive weapon and may be designed to have high surface emissivity in a wavelength band (5 to 8 μm) of low atmospheric transmittance and low surface emissivity in the atmospheric transmission window regions (3 to 5 μm and 8 to 14 μm) of high atmospheric transmittance, and thus detected infrared signals can be reduced through the infrared stealth element.

In an embodiment, although the first metal layer 10 is located on the bottom and may be manufactured using various well-known metals such as silver, copper, gold and aluminum, the first metal layer 10 is preferably formed of silver Ag having excellent electrical conductivity. Although the first metal layer 10 may be manufactured in the shape of a rectangular plane, it is not limited thereto and may be manufactured in various shapes according to the object and usage of the present invention and is preferably manufactured in the shape of a thin film. For example, thickness of the first metal layer 10 may be 0.01 to 0.2 μm. In addition, the first metal layer 10 may be formed using a metal the same as that of the second metal layer 30 or may be formed of a metal different from that of the second metal layer 30.

In an embodiment, the insulator layer 20 may be formed (stacked) on the top of the first metal layer 10 and manufactured using various well-known insulators. For example, the insulator layer 20 may be formed of silica $SiO_2$ or polyimide. In addition, although the insulator layer 20 may be manufactured in the shape of a rectangular plane, it is not limited thereto and may be manufactured in various shapes according to the shape of the first metal layer 10 and the object and usage of the present invention and is preferably manufactured in the shape of a thin film. For example, thickness of the insulator layer 20 may be 0.01 to 0.2 μm.

In an embodiment, although the second metal layer 30 may be formed (stacked) on the top of the insulator layer 20 and manufactured using various well-known metals such as silver, copper, gold and aluminum, the second metal layer 30 is preferably formed of silver Ag having excellent electrical conductivity. The second metal layer 30 may be formed using a metal the same as that of the first metal layer 10 or may be formed of a metal different from that of the first metal layer 10.

Preferably, the second metal layer 30 may include at least any one among a metal ring 31 and a metal dot 32 to improve the functionality as an infrared stealth element. The metal ring 31 configuring the second metal layer 30 may be a disk shape having a flat top surface and a hole formed at the center, and the metal dot 32 may be a cylindrical shape having a flat top surface. At this point, the combination of the metal ring 31 and the metal dot 32 is referred to as a nanostructure. In a structure having both the metal dot 32 and the metal ring 31, the metal dot 32 is located at the center of the metal ring 31 while being spaced apart from the metal ring 31 and surrounded by the metal ring 31. At this point, a dielectric thin film layer may be coated on the surface of the second metal layer 30 to protect the second metal layer (nanostructure). Although a very hard dielectric substance like a diamond-like carbon (DLC) thin film may be used as the dielectric thin film layer, it is not limited thereto, and various dielectrics may be used as a protection film, as far as maintaining the surface characteristic of the metamaterial.

Figure 1:
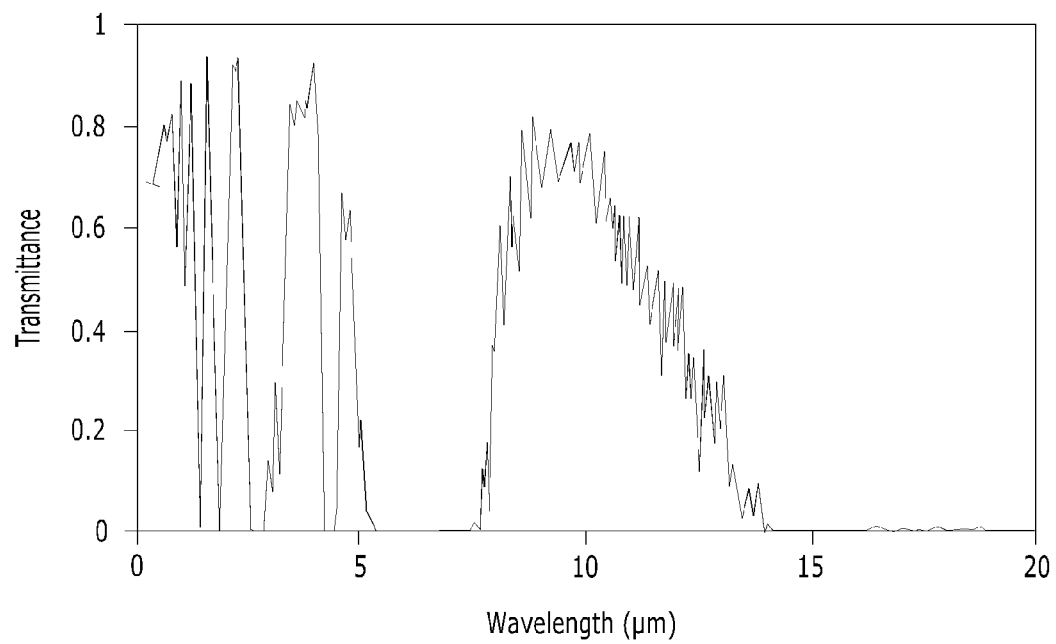
FIG. 1 is a view showing the spectral transmittance of atmosphere according to the wavelength in the infrared region.
Figure 2:
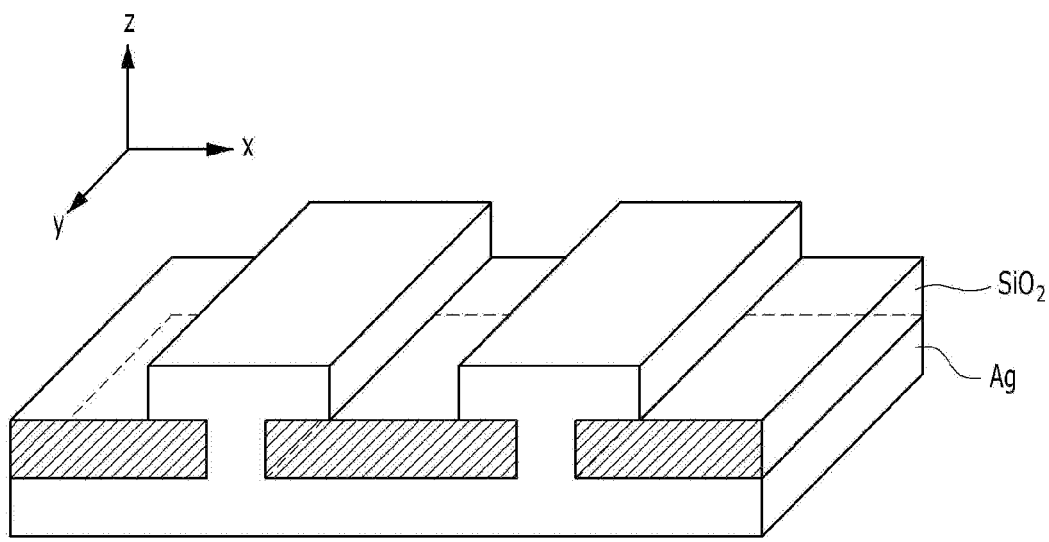
FIG. 2 is a view schematically showing a conventional infrared stealth element according to an example.

As a structure in which the second metal layer 30 includes the metal ring 31 or the metal dot 32 or includes both the metal ring 31 and the metal dot 32 located at the center of the metal ring 31 is formed, the disadvantage of changing the resonance wavelength according to the polarization and incident angle of incident light can be overcome, unlike the conventional infrared stealth element (e.g., of a T shape, see FIG. 2). That is, as a symmetric MIM thin film structure is used and, at the same time, the metal rings 31 and/or the metal dots 32 are two-dimensionally arranged to meet the polarization characteristic of various angles of the incident light, the resonance wavelength of the surface plasmon generated by the incident light and the electrons inside the metal can be changed.

Figure 6:
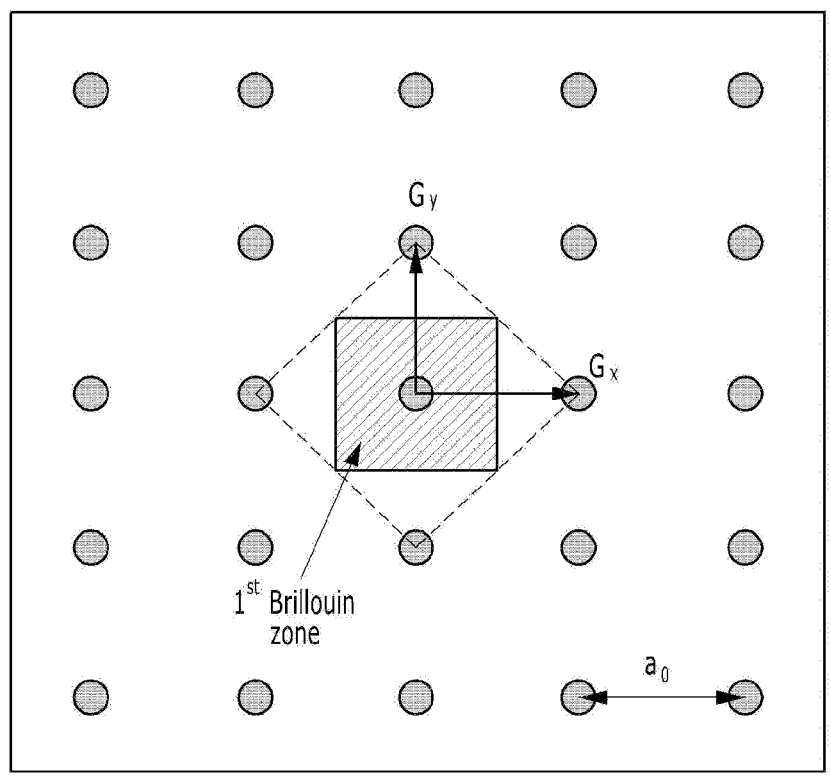
FIG. 6 is a view showing an example of two-dimensionally arranging metal dots.

Specifically, describing with reference to FIG. 6, in the structure of two-dimensionally arranging the metal rings 31 and/or the metal dots 32, the propagation constant $K_x$ of the incident light and the propagation constant $K_{sp}$ of the generated surface plasmon will satisfy Equation 2 shown below.

$$K_{sp} = K_x \pm nG_x \pm mG_y \text{ (n and m are integers)} \quad \text{[Equation 2]}$$

If the surface plasmon resonance wavelength of the two-dimensional array structure of the nanostructure is adjusted to 1.54 μm, which is the infrared laser wavelength used for laser-guided missiles, and the metal dot 32 is located at the center of the metal ring 31, a surface plasmon wave of various resonance wavelengths, such as surface Plasmon polariton (SPP) and magnetic plasmon polariton (MPP), is generated. The resonance wavelength of the surface plasmon wave like this varies according to the structure of a metal thin film and the incident angle and polarization of light. At this point, the MPP is characterized in that although intensity of resonance changes with respect to change of the angle of incident light, the wavelength is constant. That is, as the structure of the metal ring 31 and/or the metal dot 32 is included in the second metal layer 30 as shown in FIGS. 3 to 5 and the MIM structure is designed in a symmetrical structure, the present invention may reduce change of the resonance wavelength of the plasmon according to the polarization angle of the incident light to the minimum and may reduce change of the resonance wavelength according to the change of the incident angle of light by using the MPP characteristic. Accordingly, the infrared stealth element of the present invention is adequate to be used as an infrared stealth element by using the surface plasmon characteristic of the SPP and the MPP like this.

Figure 7A:
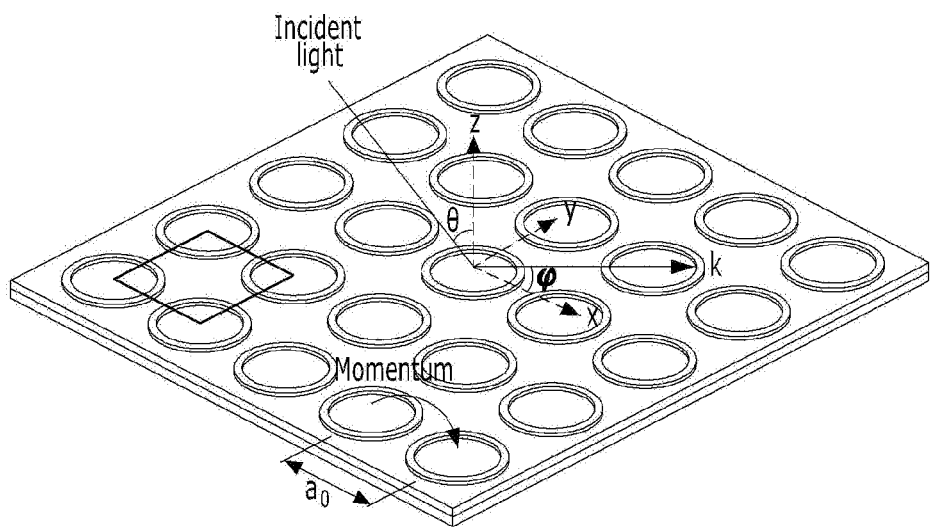
FIGS. 7A to 7C are views schematically showing an infrared stealth element according to an embodiment of the present invention, respectively having a plurality of metal rings and/or metal dots.
Figure 7B:
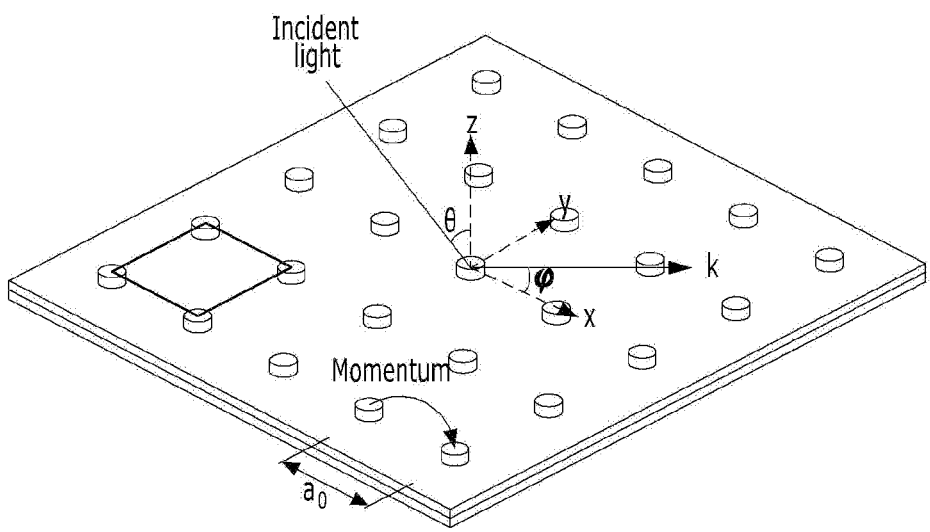
Figure 7C:
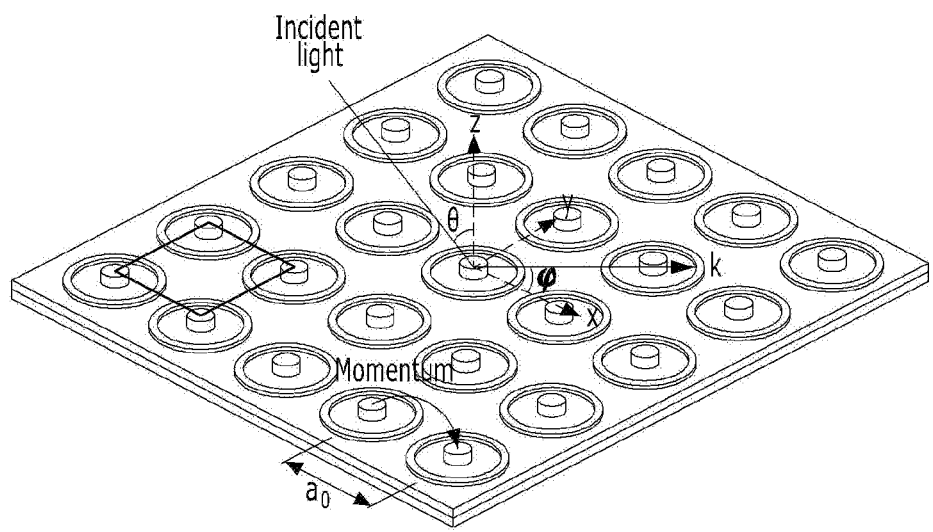
Figure 8A:
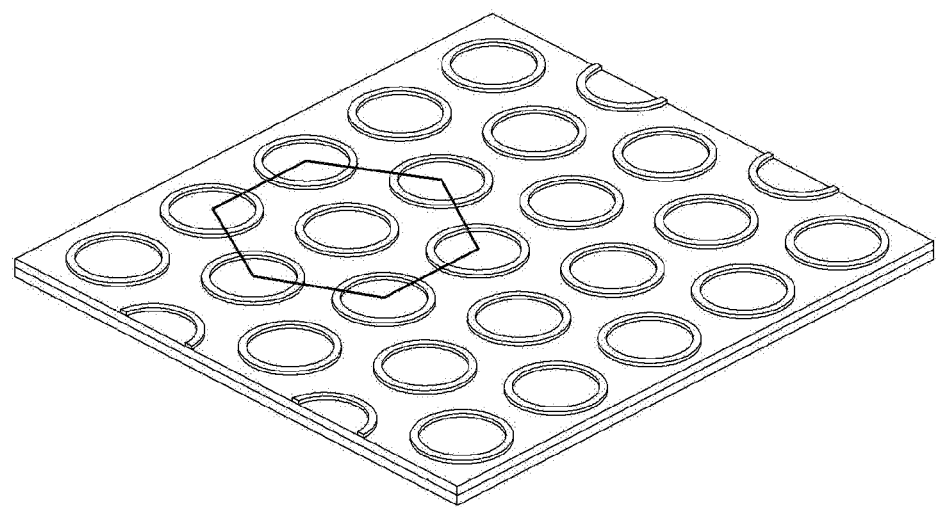
FIGS. 8A to 8C are views schematically showing an infrared stealth element according to an embodiment of the present invention, respectively having a plurality of metal rings and/or metal dots.
Figure 8B:
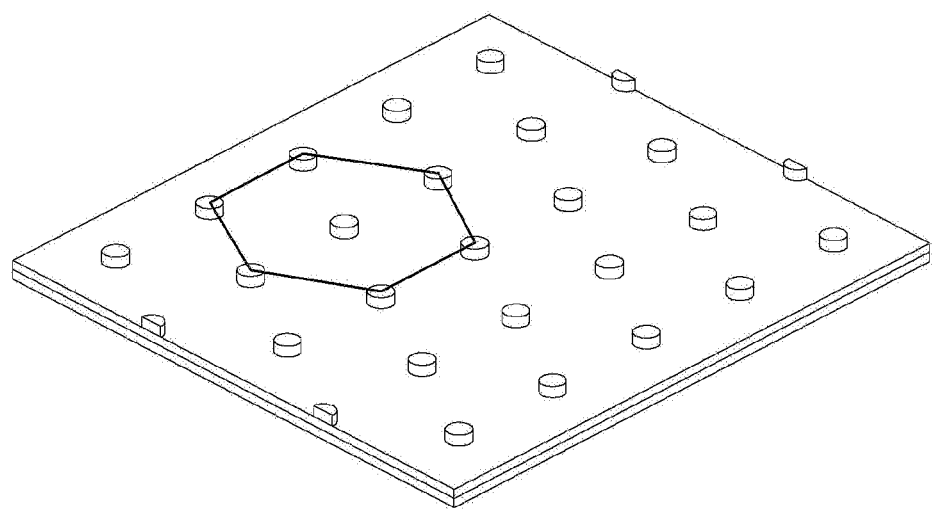
Figure 8C:
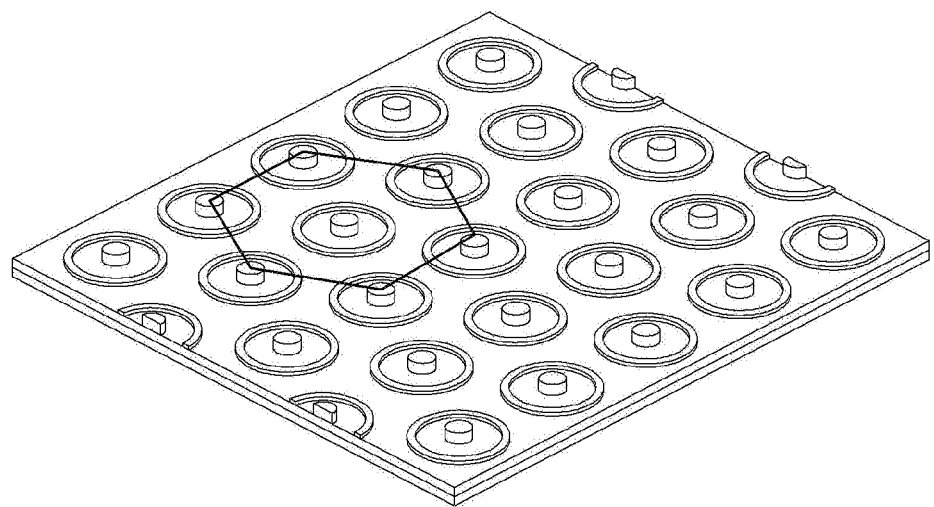

FIGS. 7A to 7C and FIGS. 8A to 8C are views schematically showing an infrared stealth element according to an embodiment of the present invention, in which the infrared stealth element has a plurality of metal rings 31 and/or metal dots 32. FIGS. 7A to 7C are views showing the metal rings 31 and/or the metal dots 32 configuring a square shape, and FIGS. 8A to 8C are views showing the metal rings and/or the metal dots configuring a hexagonal shape. That is, in the present invention, it is preferable to form the nanostructure in a symmetrical shape as shown in FIGS. 7A to 7C or FIGS. 8A to 8C. In addition, the distance $a_0$ between a metal dot 32 and an adjacent metal dot 32 (or the distance between the center of a metal ring and the center of an adjacent metal ring) may be determined according to the permittivity of the insulator layer 20 and the second metal layer 30 and may be expressed as shown below in Equation 3.

$$a_0 = \lambda_{spp} \sqrt{i^2 + j^2} \sqrt{\frac{\varepsilon_M + \varepsilon_I}{\varepsilon_M \varepsilon_I}} \quad \text{[Equation 3]}$$

Here $\lambda_{spp}$ is the wavelength of incident light, i and j are constants, and $\varepsilon_M$ and $\varepsilon_I$ are dielectric constants of metal (the second metal layer) and the insulator.

When the first metal layer 10 and the second metal layer 30 are formed of silver Ag and the insulator is formed of polyimide as a preferred embodiment, to maximize its functionality as an infrared stealth device, the infrared stealth element of the present invention may be formed in a dimension such that the thickness b of the first metal layer 10 is 0.01 to 0.2 μm, the thickness d of the insulator layer 20 is 0.01 to 0.2 μm, the thickness $t_1$ of the metal dot 32 is 0.01 to 0.2 μm, the thickness $t_2$ of the metal ring 31 is 0.05 to 0.2 μm, the radius $r_1$ of the metal dot 32 is 0.1 to 0.2 μm, the shortest distance $r_2$ from the center of the metal dot 32 to the metal ring 31 is 0.4 to 0.7 μm, the longest distance $r_3$ from the center of the metal dot 32 to the metal ring 31 is 0.5 to 0.8 μm, and the distance $a_0$ from the metal dot 32 to the nearest metal dot 32 (see FIG. 6) is 1.0 to 2.0 μm, and it is not limited to this dimension, but if the ratios between the numbers are maintained, the overall size of the element may be changed. As the infrared stealth element is designed in this structure, the wavelength of the infrared black body radiation emitted from the surface of an object is adjusted to the infrared spectrum absorption region of the atmosphere so that the infrared light emitted from the object may be absorbed in the process of propagating through the atmosphere, not to be detected by an infrared detection device. In addition, as the surface absorbs the 1.54 µm light, which is a guided laser light beam used by infrared-guided missiles, intensity of the laser light scattered on the surface is reduced. This can be effectively used as an infrared stealth device which can avoid tracking of laser-guided missiles.

Figure 9:
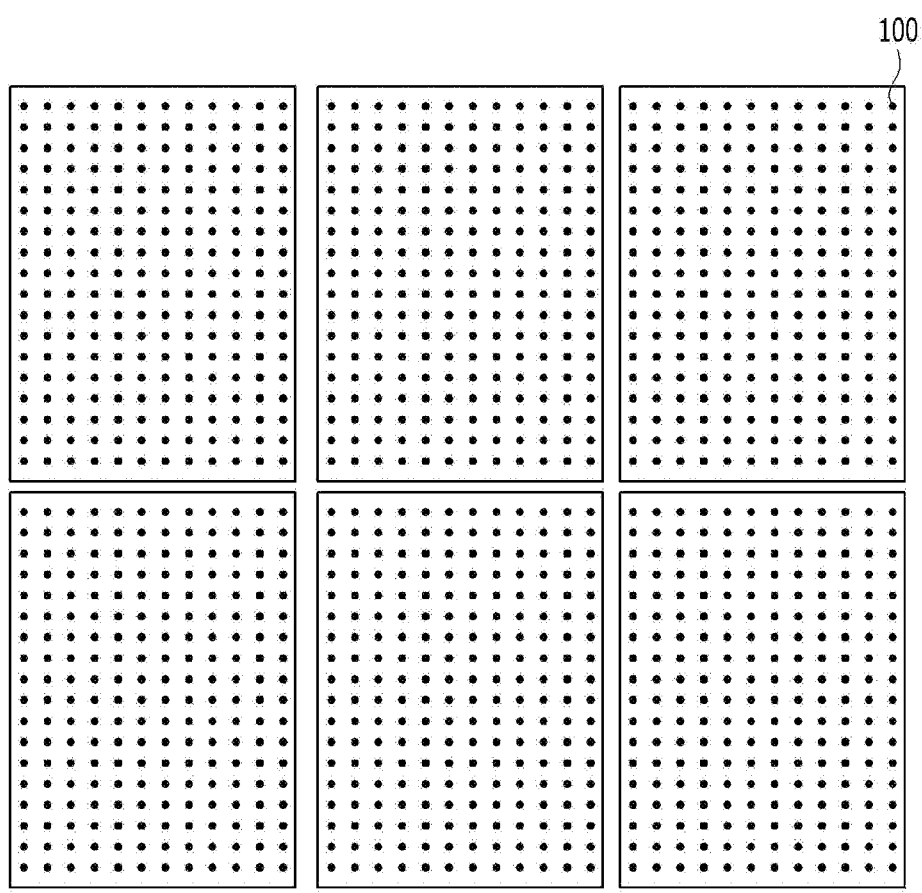
FIG. 9 is a view schematically showing an infrared stealth element manufactured in a tile shape according to an embodiment of the present invention.
Figure 10:
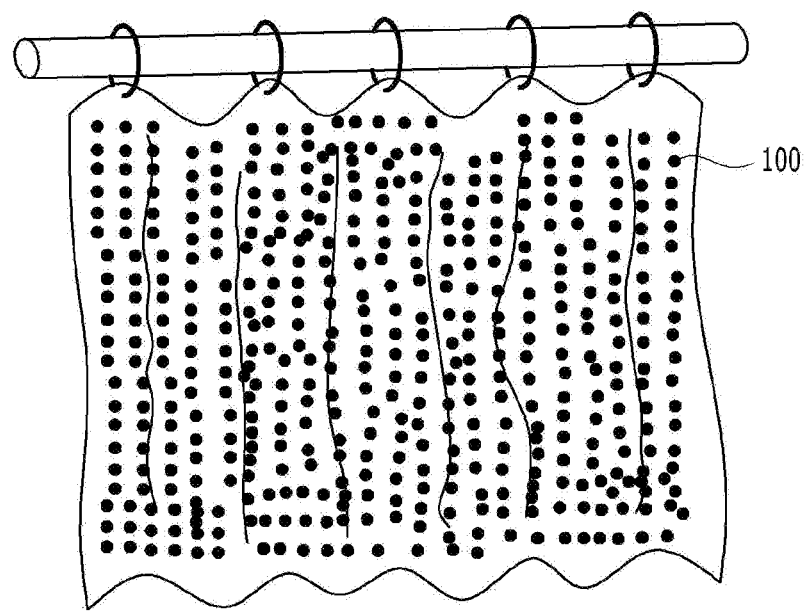
FIG. 10 is a view schematically showing an infrared stealth element according to an embodiment of the present invention, which is applied to a curtain.
Figure 11:
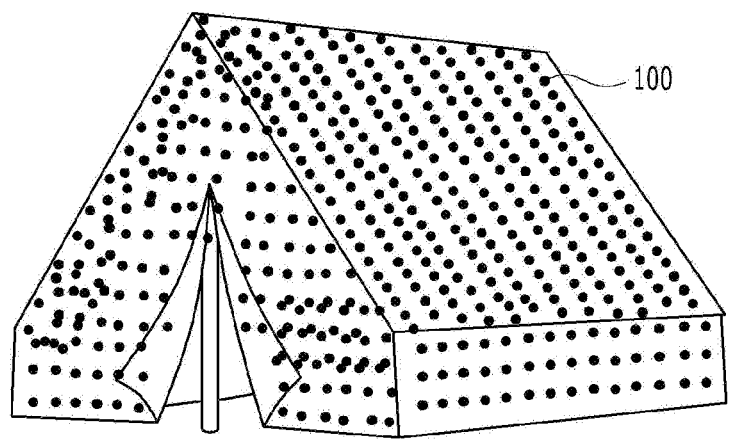
FIG. 11 is a view schematically showing an infrared stealth element according to an embodiment of the present invention, which is applied to a tent.

Meanwhile, since the infrared stealth element of the present invention has an MIM thin film structure, it can be combined with a flexible plastic or metallic thin film and utilized in various fields. For example, the infrared stealth element 100 combined with a flexible plastic or metallic thin film may be manufactured in the form of a thin tile and attached on the surface of an aircraft, as well as ground transport weapons such as tanks (see FIG. 9). In addition, when the infrared stealth element is combined on the surface of a material such as a flexible and thin plastic, it can be manufactured like a curtain or a cloak and used as a cover of a tent or the like in a needed situation, so as not to be detected by infrared equipment used at night and to avoid attack of laser-guided weapons (see FIGS. 10 and 11).

Hereinafter, the configuration of the present invention and the effect according thereto will be described in more detail through a specific embodiment. However, this embodiment is to further specifically describe the present invention, and the scope of the present invention is not limited to the embodiment.

Embodiment

An infrared stealth element is manufactured in the dimension as shown in Table 1 by forming the first metal layer and the second metal layer using silver and the insulator layer using polyimide (see FIGS. 5 and 7).

TABLE 1

| Parameter | $t_1$ | $t_2$ | d | b | $a_0$ | $r_1$ | $r_2$ | $r_3$ |
|---|---|---|---|---|---|---|---|---|
| Length (um) | 0.17 | 0.07 | 0.11 | 0.1 | 1.4 | 0.16 | 0.54 | 0.65 |

Experiment Example

Figure 12:
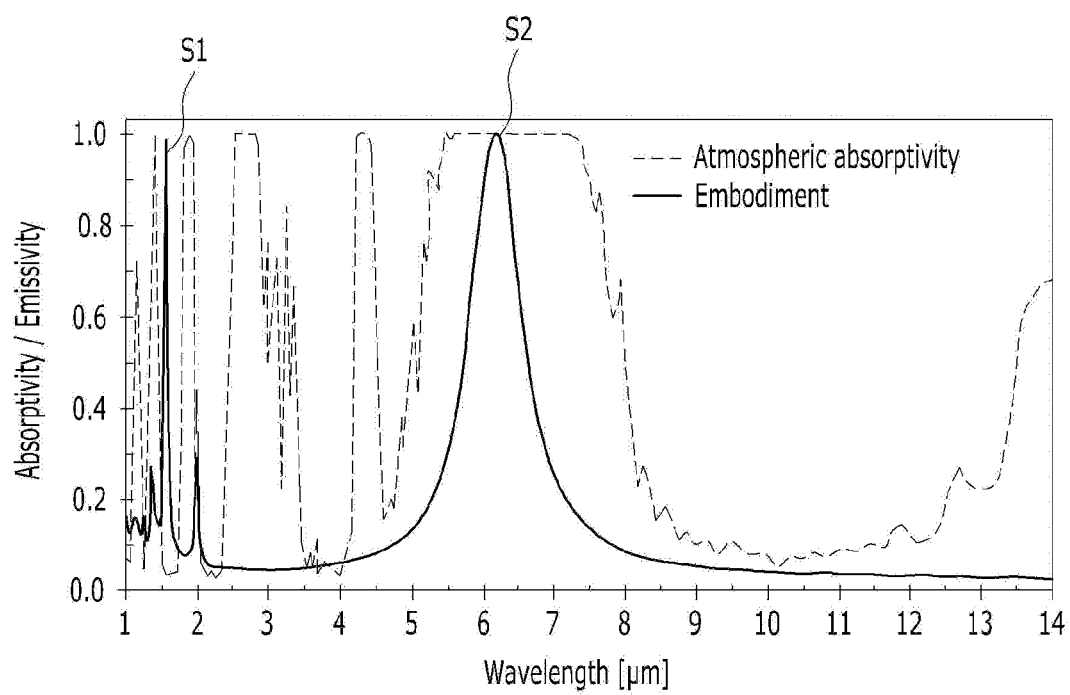
FIG. 12 is a view showing atmospheric absorptivity (the dotted line) and absorptivity of an infrared stealth element according to an embodiment of the present invention.

The absorptivity according to the wavelength of the embodiment is measured and shown in FIG. 12. FIG. 12 is a view showing atmospheric absorptivity (the dotted line) and absorptivity of the embodiment (the solid line), which is a result of calculating the plasmonic resonance wavelength of the embodiment. At this point, the narrow and tall peak S1 on the left side is adjusted to 1.54 µm, which is a laser wavelength used by laser-guided missiles, and the wide peak S2 on the right side is in the atmospheric absorption spectral range. That is, the wavelength of the infrared black body radiation emitted from the surface of an object is adjusted to the infrared spectrum absorption region of the atmosphere so that the infrared light emitted from the object is absorbed in the process of propagating through the atmosphere, not to be detected by an infrared detection device, and as the surface absorbs the 1.54 µm light, which is a guided laser light beam used by infrared-guided missiles, intensity of the laser light scattered on the surface is reduced, and thus the infrared stealth technique can be realized.

According to the present invention, as a dual band perfect absorption metamaterial of a new structure is used, there is an effect of minimizing infrared light signals emitted from military equipment and detected by an infrared detector and absorbing offensive infrared light.

In addition, as the infrared stealth element of the present invention has a thin film structure, it can be manufactured to be combined with a flexible plastic or metallic thin film and is advantageous in that it can be easily used in various devices and structures such as ground transport weapons like tanks, aircraft surfaces, tents and the like.

However, the effects of the present invention are not limited to the effects mentioned above, and unmentioned other effects may be clearly understood by those skilled in the art.

Although only some of the various embodiments performed by the inventors of the present invention are described as an example in this specification, the spirit of the present invention is not limited or restricted thereto and may be modified and diversely embodied by those skilled in the art.

What is claimed is:

1. An infrared stealth element comprising:
   a first metal layer;
   an insulator layer formed on a top of the first metal layer; and
   a second metal layer formed on a top of the insulator layer,
   wherein the second metal layer includes a metal ring and a metal dot, the metal dot being located at a center of the metal ring.

2. The element according to claim 1, wherein the metal ring and the metal dot are configured in plurality.

3. The element according to claim 2, wherein a distance $a_0$ between adjacent metal dots is determined according to permittivity of the insulator layer and the second metal layer.

4. The element according to claim 1, wherein the first metal layer and the second metal layer are formed of a same metal.

5. The element according to claim 1, wherein the first metal layer and the second metal layer are formed of different metals.

6. The element according to claim 4, wherein the first metal layer and the second metal layer are formed of silver Ag.

7. The element according to claim 1, wherein thickness of the first metal layer is 0.01 to 0.2 µm.

8. The element according to claim 1, wherein the insulator layer is formed of silica $SiO_2$ or polyimide.

9. The element according to claim 1, wherein thickness of the insulator layer is 0.01 to 0.2 µm.

10. The element according to claim 1, wherein a surface of the second metal layer is coated with a dielectric thin film layer.

* * * * *